Sept. 8, 1931.  W. E. OTWELL  1,822,744
BATTERY TERMINAL
Filed April 25, 1929
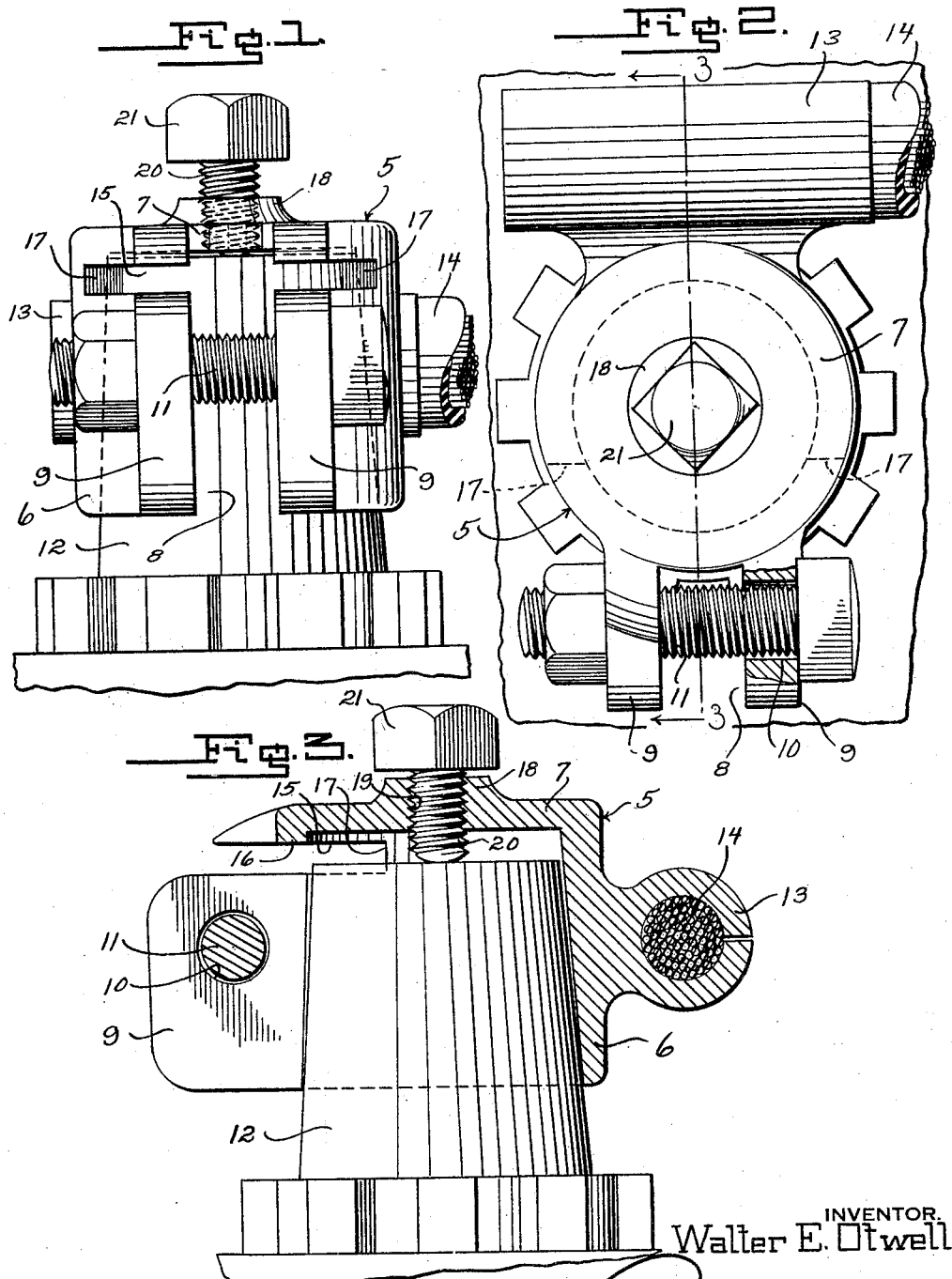
INVENTOR.
Walter E. Otwell Patented Sept. 8, 1931

1,822,744

UNITED STATES PATENT OFFICE

WALTER E. OTWELL, OF LINN, KANSAS

BATTERY TERMINAL

Application filed April 25, 1929. Serial No. 358,051.

The present invention relates to battery terminals and the primary object of the invention is to provide a battery terminal embodying means enabling ready and easy removal of the terminal from a battery post without liability of injury to the battery.

As is well known, battery terminals for storage batteries are subjected to the battery acid causing corrosion about the terminal and battery post so that the terminal so adheres to the post as to prevent ready removal of the terminal without resulting in serious injury to the battery or possible breaking of the terminal. It also essential that the terminal be tightly clamped about the battery post for insuring good electrical connection to the battery and this tight clamping of the terminal is also in a number of instances the cause preventing ready removal of the terminal. With storage batteries used upon motor vehicles it is essential that the terminal be tightly clamped about the battery post so that vibration will not loosen connection of the terminal with the battery post.

It is therefore a further object of the invention to provide a battery terminal embodying means whereby the terminal may be forced from the battery post by a pressure applied directly to the end of the post.

A further object of the invention is to provide an improved construction for battery terminals embodying a split sleeve portion adapted to embrace the battery post and be clamped thereabout, and a cap portion integral with the sleeve portion and adapted to extend over the end of the post with means threaded thru the cap portion into engagement with the end of the battery post for forcibly drawing the sleeve portion from the post.

Other objects and advantages of the invention will be apparent during the course of the following detailed description, taken in connection with the accompanying drawings forming a part of this specification and in which drawings:

Figure 1 is a side elevation of the improved battery terminal shown applied to the battery post.

Figure 2 is a top plan view of the same and showing a fragmentary portion in section.

Figure 3 is a section on line 3—3 of Figure 2.

In the drawings, and wherein similar reference characters designate corresponding parts thruout the several views, the improved battery terminal embodies a substantially cup-shaped body portion 5 including a sleeve portion 6 of substantially tubular formation and closed at its upper or outer end by a disc-shaped cap portion or end plate 7.

The sleeve portion 6 is split longitudinally and formed at each side of the slot 8 with laterally extending clamp arms 9 provided with aligning openings 10 for receiving the shank of a clamping bolt 11 serving to contract the sleeve about the battery post 12. Preferably cast integral with the body portion 5 diametrically opposite to the arms 9 and extending at a right angle to the axis of the sleeve portion 6 is a tubular extension 13 for receiving one end of a conductor 14. The socket provided by the cup-shaped body portion 5 preferably tapers toward the cap 7 to conform to the taper of the battery post 12.

The sleeve portion 6 is transversely slotted above the arms 9 as at 15, and this slot as will be observed in Figure 3 is spaced below the lower surface of the cap 7 forming a stiffening rim or flange 16 extending thruout the arcuate length of the slot. As will be observed, the ends 17 of the slot terminate short of the diametrical center of the cap 7.

The cap 7 is provided at its axial center with a boss 18 having a threaded opening 19 for receiving the threaded shank 20 of a set screw 21. As will be observed in Figure 3, the ends 17 of the slot 15 are offset to one side of the set screw shank 20. The purpose of the slot 15 is to permit a portion of the sleeve 6 to be contracted by the clamp bolt 9 for firmly clamping the terminal to the post 12.

By so having the ends 17 of the slot 15 terminating at one side of the diametric center of the cap 7 it will be seen that a portion greater than one-half of the cap 7 is integrally joined to the sleeve portion 6 and therefore possible yielding or separation of the cap from the sleeve portion will be eliminated when pressure is applied for removing the terminal from the battery post. The rim or flange 16 serves to materially stiffen that portion of the cap above the slot 15 and also aids in preventing distortion of the cap.

In manufacture of the terminal, the slots 8 and 15 may be cut in the terminal after the terminal has been cast or formed in any other approved manner.

In applying the terminal to the battery post the set screw 21 may be backed sufficiently so as to allow the sleeve 6 to sufficiently embrace the battery post and thereafter the clamp bolt 11 may be tightened for contracting the sleeve about the battery post. When it becomes necessary or desirable to remove the terminal from the battery post, the clamp bolt 11 is loosened and then upon turning the cap screw 21 the shank 20 will be fed thru the opening 19 into engagement with the end of the post 12, and rotation of the set screw will cause the cap 7 to be moved away from the end of the post and forcibly withdraw the sleeve 6 from about the post 12. Thus no pressure will be applied to any other portion of the battery other than upon the post 12 and without any strains being imparted to other portions of the battery post. With the specific construction as shown it will be seen that considerable force may be applied by the set screw 21 without tending to distort the cap 7 or force the same upwardly out of its normal position.

From the foregoing it will be apparent that an improved and efficient battery terminal has been provided embodying means whereby the terminal may be clamped to the post and an arrangement whereby the terminal may be forcibly removed from the post even tho considerable force is required, without distorting the terminal or resulting in injury to the battery.

Changes in detail may be made to the specific form of invention herein shown and described, without departing from the spirit of the invention or the scope of the following claims.

I claim:

1. In a battery terminal a cup-shaped body portion having a sleeve portion and a cap portion integrally joined to the sleeve portion, said cap portion being co-extensive with the circumferential extent of the sleeve portion, a screw threaded axially thru the cap portion, a transverse slot between the cap and sleeve portions, the ends of said slot terminating short of a diametrical line of the cap portion, a longitudinal slot extending thru the sleeve portion from the center of the transverse slot to the inner end of the sleeve portion, clamp arms on the sleeve portion, and a clamp bolt extending thru the arms for contracting the sleeve.

2. In a battery terminal, a cup-shaped body portion having a sleeve portion and a cap portion integrally joined to the sleeve portion, said cap portion being co-extensive with the circumferential extent of the sleeve portion, a screw threaded axially thru the cap portion, a transverse slot between the cap and sleeve portions, the ends of said slot terminating short of a diametrical line of the cap portion, a longitudinal slot extending thru the sleeve from the transverse slot to the inner end of the sleeve portion, clamp arms on the sleeve portion, and a clamp bolt extending thru the arms for contracting the sleeve.

WALTER E. OTWELL.